United States Patent Office 3,753,857
Patented Aug. 21, 1973

3,753,857
PHOSPHATE MODIFIED PROTEINASE-ALTERED STARCH
Saul Rogols, Circleville, Ohio, Robert L. High, Charlotte, N.C., and James E. Green, Kilbourne, Ohio, assignors to A. E. Staley Manufacturing Company, Decatur, Ill.
No Drawing. Continuation-in-part of application Ser. No. 773,959, Nov. 6, 1968. This application Mar. 8, 1971, Ser. No. 122,156
Int. Cl. C08b 19/04; C12b 3/06; D21b 3/28
U.S. Cl. 195—7                                            3 Claims

ABSTRACT OF THE DISCLOSURE

A phosphate modified, proteinase-altered starch prepared by effecting an enzymic reaction between a proteinase and the protein fragments of a starch molecule, and by the addition of a soluble, monobasic phosphate to the slurried starch. Although the phosphate modification may take place first, or simultaneously with the proteinase alteration, it is presently preferred that the proteinase alteration be accomplished first, because it appears to improve the extent of phosphate bonding. The phosphate modified, proteinase-altered starch of this invention is useful in improving the properties of paper, especially burst, tear, and tensile strength. Considerable improvement in opacity was also observed, because of the higher percentage of $TiO_2$ retention possible with this starch derivative.

BACKGROUND OF THE INVENTION

This application is a continuation-in-part of U.S. patent application Ser. No. 773,959, filed Nov. 6, 1968 now abandoned. In a copending application Ser. No. 542,502, filed Apr. 14, 1966, now U.S. Pat. 3,488,256, and in other applications, we disclosed that an enzymic reaction can be effected between an enzyme and certain atypical fragments of a starch molecule. Protein, for example, comprises a portion of these atypical fragments, and the starch molecule can be altered by reaction of these protein fragments with a proteinase. This invention contemplates the reaction of proteinase with the protein fragments of the starch molecule, and *not* the reaction of a proteinase with physically associated protein impurities in the starch. The proteinase-altered starches disclosed in said copending application were found to be useful in increasing the strength of paper, even without further modification.

Until now, the most successful commercial starch derivative for improving the strength of paper is a cationic amine alkyl starch ether made by (1) preparation of a cyanoalkylated starch, (2) reduction of the latter to an amino starch, and (3) reaction of the amine alkyl starch with ethylenimine. The above method is complicated and expensive, and a simpler, more economical process which provides a starch derivative of equal or superior properties, is provided by the subject invention. In later discussions, and for purposes of comparing properties, the above described cationic amine alkyl starch ether will be referred to as "Starch A."

It is therefore an object of this invention to provide an improved starch derivative.

It is a further object to provide a method of making such a derivative in an economical manner.

It is a specific object of the invention to provide a phosphate modified, proteinase-altered starch useful in the manufacture of paper.

It is a further specific object to provide a paper with improved properties.

SUMMARY OF THE INVENTION

This invention is directed to a phosphate modified, proteinase-altered starch prepared by the reaction of starch with a proteinase enzyme such as pepsin or papain, and by the exposure of the starch slurry to an excess of monobasic phosphate ions to obtain a high degree of retained phosphorus in the starch molecule, at least to the extent of .1% phosphorus, dry substance basis, based on the total weight of the modified starch derivative. For most effective use in paper manufacture, the preferred degree of phosphorus retention is about .3% phosphorus, dry substance basis.

The proteinase alteration of the starch molecule may be effected before, simultaneously or subsequently to the phosphate modification, but it is presently preferred that the proteinase alteration be completed first, because the proteinase seems to enhance phosphate retention by the starch molecule. The reverse is not observed, and the full benefits of the proteinase effect is not obtained when the two steps are performed simultaneously. The particular starches which have been tested thus far are wheat starch, altered with the proteinase enzyme, pepsin, and corn starch, altered with the proteinase enzyme, papain. Other starches which are expected to show somewhat similar effects are potato, tapioca, waxy maize, sorghum and cassava. Other proteinase enzymes which can be expected to exhibit some activity towards protein fragments of the above named starches are: bromelain, ficin, trypsin, chymotrypsin, carboxypeptidase-$\beta$, and peptidase. The most important of the above presently appears to be pepsin-altered wheat starch, modified with monobasic phosphate ions.

As the term "phosphate modified" indicates, the phosphate retained measured as phosphorus is only loosely held by the starch molecules. Most of the phosphate taken up by the starch is capable of being washed out with water, so it is desirable to avoid such washing to deliver a higher concentration of phosphate to a paper composition.

A proteinase-altered wheat starch having an initial phosphorus content of 550 parts per million will show 1500 p.p.m. retained phosphorus after being subjected to monobasic sodium phosphate in a concentration equal to about 1% of the starch weight. This same starch will show a retained phosphorus value of 3000 parts per million subjected to a monobasic phosphate concentration of 5% of the starch weight. Improved properties are observed with the lower retained phosphorus level of 1500 parts per million, which calculates to about .15% retained phosphorus, dry substance basis (d.s.b.), based on the weight of the starch. However, the degree of improvement over the commercial "Starch A" described above is much more significant when the retained phosphorus equals .3%, d.s.b. based on the starch weight.

The following examples illustrate some of the features of the invention, but are not intended to limit our invention in any way.

EXAMPLE 1

A slurry of wheat starch (7 liters, 36.5% solids) was stirred with 29.67 grams of monobasic sodium phosphate ($NaH_2PO_4 \cdot H_2O$) (1.16% based on dry weight of starch) for one hour. Portions (650 ml.) of the resulting slurry were then treated with various percentages of pepsin at 40° C. and a pH of 3.0 for 18 hours. The pepsin was Worthington crystallized pepsin, 2× crystallized from dilute alcohol. In each case the starch product was filtered and dried (but not washed). The starch cake was analyzed for elemental phosphorus by the procedure in Standard Analytical Methods of the Corn Industry Research Foundation, Inc. The titanium dioxide retention percentage values were derived from the method set forth in TAPPI, July 1963 at pp. 424–427 in an article by Saul Rogols and Robert L. High. Results are shown in Table 1, directly below.

TABLE 1

| Pepsin level, percent | Phosphate level, percent | P, p.p.m. | Retention of TiO$_2$, percent |
|---|---|---|---|
| 0 | 0 | 565 | 72 |
| .0 | 1.16 | 570 | 75 |
| 0.00005 | 1.16 | 1,498 | 84 |
| .0005 | 1.16 | 1,618 | ------ |
| .001 | 1.16 | 1,647 | ------ |
| .005 | 1.16 | 1,938 | 90 |
| .013 | 1.16 | 1,598 | ------ |
| .050 | 1.16 | 1,519 | ------ |
| .100 | 1.16 | 1,460 | ------ |
| .100 | 0 | 780 | 80 |

In analyzing Table 1, it can be seen that the first sample, which had no added phosphate, still analyzed at 565 parts per million, which is the amount naturally present in native wheat starch. The proteinase alteration was performed subsequently to the phosphate addition in Example 1, and no significant difference in phosphate retention was observed between those samples having various pepsin levels, other than the fact that the sample having .005% pepsin seemed to exhibit best phosphate retention when tested, and a corresponding high percentage (90%) of titanium dioxide retention when tested. The further increase of pepsin level seemed to decrease phosphate retention and a lesser pepsin level also showed less than optimum phosphate retention. In the sample which had no pepsin, but only phosphate added, the retained phosphate was only a little better than wheat starch with no pepsin or added phosphate. In the example which had no added phosphate, but a .1% pepsin level, the phosphate retention was better than straight wheat starch, indicating that the pepsin alteration improves phosphate retention otherwise lost during the test. In conclusion, phosphate retention was improved by the alteration of the starch with a proteinase enzyme as compared to unaltered starch, and, in the case of proteinase altered wheat starch, it appeared that there was an optimum pepsin level of about .005%.

EXAMPLE 2

Example one was repeated except corn starch which had been treated with 0.05% hydrogen peroxide for one hour at pH 8 was used with papain (0.2%) at room temperature at pH 4 for 4 hours. Results are shown in Table 2 below.

TABLE 2

| Papain, percent | Phosphate, percent | P, p.p.m. |
|---|---|---|
| 0 | 0 | 152 |
| .001 | 1 | 1,101 |
| .005 | 1 | 1,064 |
| .013 | 1 | 1,081 |

Considerable improvement in phosphorus retention was observed when the corn starch was treated with papain as compared to zero papain level, and this improvement seemed to increase as the papain level increased, even past the .005% level. This would indicate that the optimum papain level for corn starch is somewhat higher than the optimum pepsin level for wheat starch.

EXAMPLE 3

Some of the pepsin levels of Example 1 were repeated using pepsin treated wheat starch, except that Winthrop 1:10,000 pepsin was used and the phosphate concentration was increased to 5% based on the dry weight of the starch. Results are shown in Table 3 below.

TABLE 3

| Pepsin, percent | Phosphate, percent | P, p.p.m. |
|---|---|---|
| 0 | 0 | 590 |
| .013 | 5 | 3,690 |
| .13 | 5 | 3,183 |

It can be seen that the higher phosphate percentage produces a substantially greater phosphorus retention level. The lower pepsin level of .013% seemed to be more effective than the substantially higher level of .13% pepsin.

EXAMPLE 4

Phosphate modified, pepsin-altered wheat starches were precipitated by methanol to illustrate their capacity to retain phosphate. Pepsin-altered wheat starches were dry blended, respectively, with 0.25, 0.75, 1.25, and 2.0% monobasic sodium phosphate. The blends were slurried, heated at a boil for 60 minutes, and then cooled to about 60° C. Equivalent volumes of methanol were added. The mix was filtered with suction and the methanol precipitates were dried. The phosphorus analysis of the products and of suitable controls comprising unmodified wheat starch are shown in Table 4 below.

TABLE 4

| Percent phosphate added | P (p.p.m.) | |
|---|---|---|
| | Starch | Altered starch |
| 0 | 535 | 577 |
| .25 | 596 | 629 |
| .75 | 755 | 774 |
| 1.25 | 918 | 954 |
| 2.00 | 1,057 | 1,150 |

It will be noted that the pepsin-altered starch with no added phosphate has a higher phosphorus analysis than the comparison starch. This is because the above procedure effects washing some of the phosphate from unmodified starch, whereas the pepsin-altered starch retains this phosphate. The other examples illustrate that the pepsin altered starch retains more phosphorus at each increased phosphate concentration level than the unmodified wheat starch.

EXAMPLE 5

Pepsin (N.F. Grade 1:6000 Wilson) was added at the 0.013% level to slurried wheat starch. The enzymic reaction was effected for 4 hours at 40° C. and at pH 3. Aliquot portions (50 ml.) were taken and .25, .75, 1.0, 3.0 and 5.0% of monobasic sodium phosphate were added, respectively, to the various portions. The phosphate was mixed for ½ hour at 40° C. and at pH 3. The samples were then filtered through No. 1 Whatman filter paper, washed 3 times with 500 mls. of distilled water (each time) by reslurrying the starch cake. Control starches (unmodified wheat starch with no added pepsin) were also similarly tested for comparison purposes. The results of these tests are set forth immediately below in Table 5.

TABLE 5

| Percent phosphate added | Washing | P (p.p.m.) | |
|---|---|---|---|
| | | Wheat starch | Altered starch |
| 0 | 0 | 0 | 43 |
| | 1 | 0 | 16 |
| | 2 | 0 | 8 |
| | 3 | 0 | 1 |
| .25 | 0 | 38 | 247 |
| | 1 | 10 | 25 |
| | 2 | 4 | 4 |
| | 3 | 2 | 2 |
| .75 | 0 | 655 | 907 |
| | 1 | 45 | 50 |
| | 2 | 7 | 7 |
| | 3 | 3 | 2 |
| 1.0 | 0 | 966 | 1,395 |
| | 1 | 67 | 81 |
| | 2 | 10 | 10 |
| | 3 | 3 | 3 |
| 3.0 | 0 | 2,435 | 3,835 |
| | 1 | 161 | 221 |
| | 2 | 17 | 25 |
| | 3 | 5 | 5 |
| 5.0 | 0 | 4,340 | 5,490 |
| | 1 | 221 | 364 |
| | 2 | 26 | 37 |
| | 3 | 7 | 0 |

The above table shows the phosphate retained as percent phosphorus in the initial filtrate and in each of three washings. It can be seen from Table 5 that the phosphorus retention was better in all cases even after one washing. The most significant improvement in phosphorous retention appears to be when the concentration of the monobasic phosphate added is at least 3%.

EXAMPLE 6

Example 5 was repeated, using monobasic phosphate as before, a wheat starch, and pepsin, except that the phosphate was added prior to the enzymic reaction. Results are shown in Table 6 below.

TABLE 6

| Percent phosphate added | Washing | P (p.p.m.) Wheat starch | P (p.p.m.) Altered starch |
|---|---|---|---|
| 0 | 0 | 0 | 12.6 |
|  | 1 | 0 | 1.6 |
|  | 2 | 0 | 1.2 |
|  | 3 | 0 | 0.3 |
| .25 | 0 | 22.0 | 284 |
|  | 1 | 2.2 | 21 |
|  | 2 | 0 | 4 |
|  | 3 | 0 | 1 |
| .75 | 0 | 743 | 784 |
|  | 1 | 44 | 51 |
|  | 2 | 6.6 | 5 |
|  | 3 | 1.6 | 0.4 |
| 1.0 | 0 | 954 | 1,060 |
|  | 1 | 65 | 66 |
|  | 2 | 8.0 | 6 |
|  | 3 | 2.3 | 3 |
| 3.0 | 0 | 2,795 | 3,295 |
|  | 1 | 187 | 189 |
|  | 2 | 19 | 22 |
|  | 3 | 4.3 | 0 |
| 5.0 | 0 | 4,000 | 5,175 |
|  | 1 | 335 | 228 |
|  | 2 | 32 | 32 |
|  | 3 | 4.2 | 7 |

In comparing the results obtained in both tables 5 and 6, in which the sequence of adding the pepsin was reversed, it can be seen that a better degree of phosphate retention analyzed as phosphorus was obtained when the pepsin alteration was performed first, as was done in Example 5. For example, when 1% phosphate was added *after* the prior pepsin alteration step, the retained phosphorus analysis was 1395 parts per million, as compared to 1060 parts per million retained phosphorus when the phosphate was added first as in Example 6. Phosphate retention after washing was also somewhat better. This trend was even more pronounced when higher concentrations of monobasic phosphate solutions were compared. For example, when a 3% phosphate solution was used, the table 5 results were 3835 parts per million phosphate retained analyzed as phosphorus as compared to 3295 parts per million phosphorus for table 6, in which the phosphate modification was done first. The 3% addition showed the greatest percentage of improvement in phosphate retention.

EXAMPLE 7

Handsheets of kraft paper were made and included, respectively, phosphate modified, pepsin-altered wheat starch and phosphate modified, papain-altered corn starch as indicated in Tables 7, 8, 9 and 10 below. The burst, tear and tensile strengths of an unbleached kraft paper are shown, respectively, in Tables 7, 8 and 9. The opacity of a 60% unbleached-40% bleached kraft paper is shown in Table 10. Products were compared with controls having no starch and with commercially available Starch A referred to above.

TABLE 7

| Starch | Starch, percent of pulp | Burst strength Gms./sq. in. | Percent improvement |
|---|---|---|---|
| Starch "A" | 0 | 531 | |
|  | .25 | 690 | 29.9 |
|  | .5 | 733 | 38.4 |
| Blank (no starch) | | 543 | |
| Papain-corn (no added PO₄) | 0 | 540 | |
|  | .25 | 574 | 6.3 |
|  | .5 | 676 | 25.2 |
| Pepsin-wheat (no added PO₄) | .5 | 556 | 2.40 |
| Pepsin-wheat, 600 p.p.m. P | 0 | 531 | |
|  | .25 | 727 | 36.9 |
|  | .5 | 714 | 34.5 |
| Pepsin-wheat, 1,100 p.p.m. P | 0 | 536 | |
|  | .25 | 607 | 12.8 |
|  | .5 | 702 | 30.9 |
| Pepsin-wheat, 3,100 p.p.m. P | 0 | 525 | |
|  | .25 | 713 | 35.8 |
|  | .5 | 740 | 40.9 |
| Wheat, 3,100 p.p.m. P | .5 | 556 | 2.40 |

TABLE 8

| Starch | Starch, percent of pulp | Tear strength 7 bar (gms./sheet) | Percent improvement |
|---|---|---|---|
| Starch "A" | 0 | 1,623 | |
|  | .25 | 1,897 | 16.9 |
|  | .5 | 1,773 | 9.24 |
| Blank (no starch) | | 1,102 | |
| Papain-corn (no added PO₄) | 0 | 1,623 | |
|  | .25 | 1,884 | 18.1 |
|  | .5 | 1,830 | 12.75 |
| Pepsin-wheat, (no added PO₄) | .5 | 1,017 | (7.50) |
| Pepsin-wheat, 600 p.p.m. P | 0 | 1,837 | |
|  | .25 | 1,870 | 1.8 |
|  | .5 | 1,756 | −4.41 |
| Pepsin-wheat, 1,100 p.p.m. P | 0 | 1,743 | |
|  | .25 | 1,854 | 6.4 |
|  | .5 | 1,903 | 9.18 |
| Pepsin-wheat, 3,100 p.p.m. P | 0 | 1,623 | |
|  | .25 | 2,090 | 28.8 |
|  | .5 | 2,199 | 35.5 |
| Wheat, 3,100 p.p.m. | .5 | 1,018 | (7.50) |

TABLE 9

| Starch | Starch, percent of pulp | Tensile strength Gms./M² | Percent improvement |
|---|---|---|---|
| Starch "A" | 0 | 3,150 | |
|  | .25 | 3,093 | −1.8 |
|  | .5 | 3,555 | 12.86 |
| Blank (no starch) | | 2,603 | |
| Papain-corn (no added PO₄) | 0 | 3,257 | |
|  | .25 | 3,108 | −7.34 |
|  | .5 | 3,209 | −1.41 |
| Pepsin wheat (no added PO₄) | .5 | 2,800 | 1.00 |
| Pepsin-wheat, 600 p.p.m. P | 0 | 3,209 | |
|  | .25 | 3,459 | 7.8 |
|  | .5 | 3,841 | 19.70 |
| Pepsin-wheat, 1,100 p.p.m. P | 0 | 2,958 | |
|  | .25 | 3,078 | 4.05 |
|  | .5 | 3,173 | 7.27 |
| Pepsin-wheat, 3,100 p.p.m. P | 0 | 3,185 | |
|  | .25 | 3,555 | 5.35 |
|  | .5 | 3,746 | 17.61 |
| Wheat (3,100 p.p.m.) | .5 | 2,760 | 0.5₀ |

TABLE 10

| Starch | Starch percent of pulp | Opacity, 60 unbleached, 40 bleached | Increase over blank |
|---|---|---|---|
| Starch "A" | 0 | 89.48 | |
| | .25 | 92.18 | 2.7 |
| | .5 | 92.99 | 3.5 |
| | 1 | 93.04 | 3.5 |
| Papain-corn (no added PO₄) | 0 | 89.82 | |
| | .25 | 90.55 | 0.5 |
| | .5 | 91.73 | 1.8 |
| | 1 | 92.66 | 2.7 |
| Pepsin, wheat 600 p.p.m. P | 0 | 88.51 | |
| | .25 | 90.99 | 2.4 |
| | .5 | 91.83 | 3.3 |
| | 1 | 91.98 | 3.4 |
| Pepsin-wheat, 1,100 p.p.m. P | 0 | 89.92 | |
| | .25 | 91.28 | 1.3 |
| | .5 | 92.89 | 3.0 |
| | 1 | 92.64 | 2.4 |
| Pepsin-wheat, 3,100 p.p.m. P | 0 | 89.95 | |
| | .25 | 90.91 | 1.0 |
| | .5 | 91.55 | 1.5 |
| | 1 | 92.73 | 2.7 |

It is to be understood that while the above described processes and products constitute preferred embodiments of our invention, these specific processes and products are for the purposes of illustration only, and that the invention is not limited to the precise forms disclosed, and various changes may be made therein without departing from the scope of the invention which is defined by the appended claims.

We claim:

1. The method of making a modified starch derivative, the steps comprising preparing a slurry of a cereal starch selected from the group consisting of corn and wheat starches, adjusting the pH of said slurry to a range of about 3.0–3.5 at a temperature from 30–40° C., adding a proteinase enzyme selected from the group consisting of pepsin and papain in an amount of about .013–.026% of said starch, dry substance basis, reacting said proteinase enzyme with said cereal starch for at least about twelve hours, then adjusting the pH of said reaction mixture to a range of about 5.5–6.0, adding a monobasic phosphate in an amount of about 3.0–4.0% by weight of the initial starch weight, dry substance basis to said reaction mixture while agitating said mixture, readjusting the pH of said reaction mixture to 5.5–6.0, and then drying said mixture to obtain a proteinase-altered, phosphate modified starch derivative useful as a strength increasing additive in the manufacture of paper.

2. The method of claim 1, in which the proteinase reacted starch at pH 5.5–6.0 is first dried to granule form and then subjected to the action of a dry blend of about 3% monobasic phosphate, dry substance basis, of the proteinase reacted starch.

3. A method of making a modified starch derivative for use in paper manufacture, the steps comprising, adding water to a wheat starch to form an aqueous slurry, adding a solution of the proteinase enzyme pepsin said solution containing at least .005% by weight pepsin, and thereafter subjecting said pepsin-altered wheat starch to the action of a solution of monobasic phosphate ions, said monobasic phosphate solution comprising at least 3% by weight phosphate, and said monobasic phosphate being selected from the group consisting of Na₂HPO₄·H₂O and K₂HPO₄·H₂O.

References Cited
UNITED STATES PATENTS

| | | | |
|---|---|---|---|
| 2,364,590 | 12/1944 | Schopmeyer et al. | 162—175 |
| 2,884,412 | 4/1959 | Neukom | 260—233.5 |
| 3,329,673 | 7/1967 | Greidinger et al. | 260—233.5 |
| 3,488,256 | 1/1970 | High et al. | 195—31 |
| 3,498,882 | 3/1970 | Rogols et al. | 195—31 |
| 3,459,632 | 8/1969 | Caldwell et al. | 260—233.5 |

ALLAN LIEBERMAN, Primary Examiner

U.S. Cl. X.R.

106—210; 162—175; 195—31 R, 31 P; 260—233.3, 233.5